A. PRIESTMAN.
PROCESS OF ELEVATING LIQUIDS.
APPLICATION FILED APR. 27, 1912.
1,102,683.
Patented July 7, 1914.
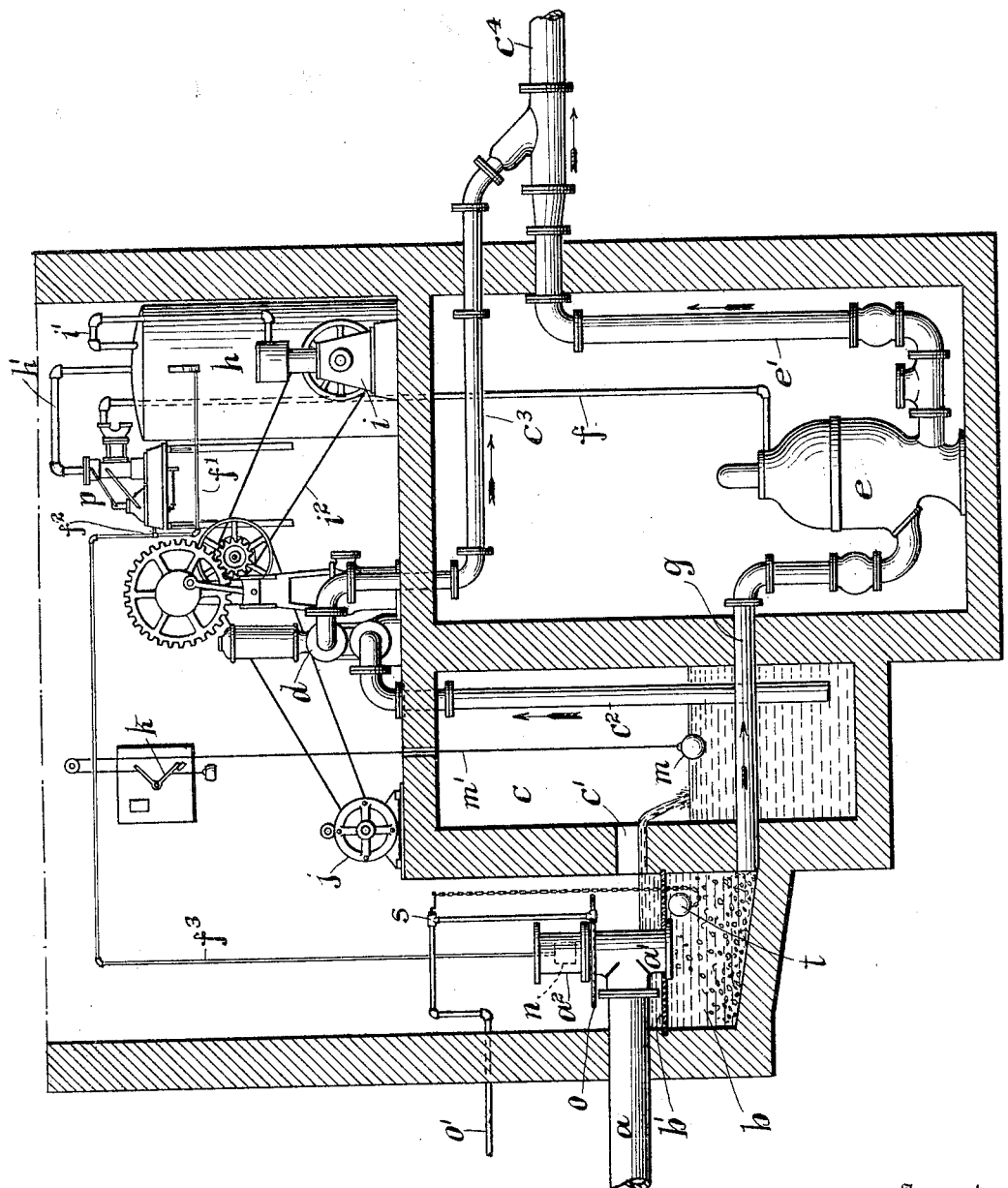
Witnesses
Daniel Webster Jr.
R. N. Kelly
Inventor
Albert Priestman
By
Attorney

UNITED STATES PATENT OFFICE.

ALBERT PRIESTMAN, OF PHILADELPHIA, PENNSYLVANIA.

PROCESS OF ELEVATING LIQUIDS.

1,102,683.

Specification of Letters Patent. Patented July 7, 1914.

Application filed April 27, 1912. Serial No. 693,691.

*To all whom it may concern:*

Be it known that I, ALBERT PRIESTMAN, a subject of the King of England, and a resident of Germantown, in the city and county of Philadelphia, State of Pennsylvania, have invented an Improvement in Processes of Elevating Liquids, of which the following is a specification.

It is the object of my invention to enable sewage, and like fluids containing solid matter in suspension, to be lifted more economically and efficiently than has heretofore been possible. On the one hand, the costs of installation, up-keep and operation must be considered, on the other, deterioration, and operative efficiency. A system that may operate at a higher hydro-dynamic efficiency, though of greater cost of installation, may be wholly unsatisfactory and uneconomical because of deterioration and lack of operative efficiency.

The greatest difficulty met in systems of elevating sewage is the presence, in such large quantity, of solid matter in suspension, which must pass through the lifting apparatus. This solid matter, if permitted to collect within the lifting devices, will increase the wear and tear and cause frequent stoppages, thereby reducing the efficiency and necessitating constant manual attention with the additional cost incident thereto. The liquid portion of sewage, which constitutes by far the greater part, may be lifted with the greatest efficiency and economy by a pump, but the solids, if passed through the pump, will quickly collect therein and render it inefficient. The sewage may be lifted by air pressure from an ejector without bringing any of the solid matter in contact with the valves, or operative parts, but such systems do not have the best economical quality, because of the large amount of liquid which must be handled.

In carrying out my invention I first separate the greater part of the solid matter from the liquid, and then separately discharge the sludge and separated liquid to the desired level. This enables me to use an ordinary pump for raising and discharging the liquid, and an ejector operated by air pressure or other means for raising and discharging the sludge, or separated solid matter. The operation of the pump may be controlled automatically by the level of the separated liquid, and this means may also be employed for admitting air to the ejector to discharge the sludge therefrom.

The invention also includes methods for effectively separating the liquid from the sludge and separately discharging them to their respective lifting devices, and methods for controlling the operation of the ejector independently of the accumulation of the liquid separated from the sludge.

The drawing shows a diagrammatic arrangement of an apparatus for raising sewage by the process.

The sewage enters by the inlet pipe $a$ and is discharged through the outlet $a'$ into a well $b$, preferably below a screen $b'$. While I have shown a comparatively small well $b$, it is to be understood that it may be enlarged to any extent necessary to effect the desired separation in the sewage supplied. Above the screen $b'$ is a passageway $c'$ into a well $c$ from the bottom of which a suction pipe $c^2$ leads to a circulating pump $d$, from which the discharge pipe $c^3$ leads to the main $c^4$. From the bottom of the chamber $b$ a pipe $g$ leads to an ejector $e$, which, as shown, is operated by compressed air, and from which the discharge pipe $e'$ leads to the main $c^4$.

I have shown an ejecting apparatus of the character shown and described in Letters Patent 979,698, dated December 27, 1910, in which the contents of the vessel $e$ are discharged intermittently by measured charges of compressed air admitted to the vessel $e$ through an air-pipe $f$ under the control of valve devices $p$. In the apparatus shown in that patent the valve devices $p$ are controlled by air pressure through a pipe leading from the vessel $e$, but in the present instance they are controlled by air pressure through a pipe $f'$, leading from the air tank $h$ and having a connection $f^2$ with the valve devices for controlling their operation in the manner described in said patent. The particular character of the valve devices or means for controlling the supply of air to the ejector $e$ is not, however, material to the present invention. The compressed air which is admitted to the ejector $e$ under the control of the valve device $p$ is supplied by a pipe $h'$ from the air tank $h$.

$i$ is an air compressor by which air under compression is accumulated in the tank $h$ through the pipe $i'$. As shown the compressor $i$ is driven from the pump $d$ by a belt $i^2$.

$j$ is an electrically driven motor belted to the pump $d$ and controlled by the switch $k$.

$m$ is a float in the well $c$ having an operating connection $m'$ with the switch $k$.

$n$ is an air-bell in an upper extension $a^2$ of the supply pipe $a$ and is connected by an air pipe $f^3$ with the valve device $p$.

$o$ is a spray pipe in the chamber $b$ above the screen $b'$ supplied by a pipe $o'$ and controlled by a valve $s$ which is operated by a float $t$ in the chamber $b$.

The operation of this apparatus is as follows: The sewage enters the chamber $b'$ through the inlet $a'$ below the screen $b'$. The solid matter falls to the bottom, and the liquid, strained by the screen $b'$, passes through the opening $c'$ into the well $c$. When the liquid in the well $c$ has attained a predetermined level it lifts the float $m$ and closes the switch $k$ putting the motor $j$ into operation to drive the pump $d$ and air compressor $i$. The pump $d$ removes the liquid from the well $c$ and discharges it through the pipe $c^3$ to the main $c^4$ or elsewhere, until the level of the liquid in $c$ is again lowered to an extent sufficient for the float $m$ to open the switch $k$ and stop the motor. Meanwhile the compressor $i$ has been accumulating pressure in the tank $h$, and when a predetermined pressure is attained a small portion of air is discharged through the pipe $f'$ to the valve devices $p$, actuating them to open and admit a charge of compressed air to the ejector $e$ to discharge the sludge which has gravitated therein through the pipe $g$ from the chamber $b$. As soon as the contents of the chamber $b$ have fallen to a sufficient extent to operate the float $t$, $i.$ $e.$ below the screen $b'$, the valve $s$ is opened and water is thrown by the spray-pipe $o$ upon the screen $b'$ to clean it. If the screen $b'$ should become clogged the sewage will rise in the extension $a^3$ and force air through the bell $n$ and pipe $f^3$ to actuate the valve $p$ and admit a charge of air to the ejector $e$ and thus discharge the contents of the chamber $b$ and permit the screen to be washed irrespective of the level of the liquid in the well $c$.

It is to be understood that while I prefer the apparatus shown and above described, I do not mean to limit my invention thereto, as the essential feature resides in the separation of the solids from the liquids, however accomplished, and the separate lifting of the sludge and liquid after separation by whatever means those operations may be effected. The apparatus shown and described, however, forms the subject matter of my application Ser. No. 779,411, filed July 17, 1913, as a division of this application. It is to be understood also that in speaking of "sludge" and "liquid" I do not mean that all liquid is to be separated from the solid matter, or that a perfect and complete separation must take place. In actual operation a quantity of liquid will remain with the solids and pass through the ejector or solids-elevating apparatus, but the object is to remove the greater part of the solids from the liquid, so that the liquid may pass through a pump or equivalent liquid-elevating apparatus, with as little fouling of the working parts as possible.

What I claim is as follows:

1. The method of elevating sewage and like fluids containing solid matter in suspension, which consists in first separating part of the solid matter from the liquid, then separately raising the sludge and liquids after separation to the desired level and controlling the raising of the sludge and liquids by the liquid level.

2. The method of elevating sewage and like fluids containing solid matter in suspension, which consists in delivering the sewage to a well at a low level, separating part of the solids from the liquid in said well, discharging the liquid into a second well, withdrawing the separated liquid from said second well and discharging it at a higher level, and discharging the separated sludge from the first well.

3. The method of elevating sewage and like fluids containing solid matter in suspension, which consists in delivering the sewage to a well at a low level, separating part of the solids from the liquid in said well, discharging the liquid into a second well, withdrawing the separated liquid from said second well and discharging it at a higher level, and withdrawing the separated sludge from the first well and discharging it at a higher level.

4. The method of elevating sewage and like fluids containing solid matter in suspension, which consists in separating part of the solids from the liquid, pumping the separated liquid and discharging it at a higher level, discharging the separated sludge and automatically controlling the discharge of the sludge by the liquid level.

5. The method of elevating sewage and like fluids containing solid matter in suspension, which consists in first separating part of the solid matter from the liquid, pumping out the separated liquid, ejecting the separated sludge by air pressure and controlling the air pressure by the level of the liquid.

6. The method of elevating sewage and like fluids containing solid matter in suspension, which consists in first separating part of the solid matter from the liquid, pumping out the separated liquid, automatically controlling the pumping operation by the level of the separated liquid, and discharging the separated sludge.

7. The method of elevating sewage and like fluids containing solid matter in suspension, which consists in first separating part of the solid matter from the liquid, pumping out the separated liquid, automatically controlling the pumping operation by the level of the separated liquid, and ejecting the separated sludge by air pressure, and automatically controlling the ejecting operation by the pumping operation.

8. The method of elevating sewage and like fluids containing solid matter in suspension, which consists in first separating part of the solid matter from the liquid, pumping out the separated liquid, automatically controlling the pumping operation by the level of the separated liquid, and ejecting the separated sludge by air pressure and automatically controlling the ejecting operation by the level of the incoming sewage before separation.

9. The method of elevating sewage and like fluids containing solid matter in suspension, which consists in first separating part of the solid matter from the liquid, pumping out the separated liquid, automatically controlling the pumping operation by the level of the separated liquid, and ejecting the separated sludge by air pressure and automatically controlling the ejecting operation both by the pumping operation for removing the separated liquid and by the level of the incoming sewage before separation.

10. The method of elevating sewage and like fluids containing solid matter in suspension, which consists in first leading the sewage into a well, leading the liquid and sludge from said well into separate receptacles, ejecting the sludge from its receptacle, controlling the discharge of the sludge from its receptacle by the level of the incoming sewage in the well, and discharging the separated liquid from its receptacle.

11. The method of elevating sewage and like fluids containing solid matter in suspension, which consists in first screening the sewage, discharging the screened liquid and unscreened sludge into separate receptacles, and separately discharging the liquid and sludge from their respective receptacles.

12. The method of elevating sewage and like fluids containing solid matter in suspension, which consists in first screening the sewage, discharging the screened liquid and unscreened sludge into separate receptacles, and separately discharging the liquid and sludge from their respective receptacles into a common main at a higher level.

In testimony of which invention, I hereunto set my hand.

ALBERT PRIESTMAN.

Witnesses:
R. M. KELLY,
E. W. SMITH.

---

Copies of this patent may be obtained for five cents each, by addressing the "Commissioner of Patents, Washington, D. C."